Oct. 31, 1961  F. D. MILLER  3,006,719
SOLVENT EXTRACTION PROCESS FOR SEPARATING
HAFNIUM FROM ZIRCONIUM
Filed July 17, 1957
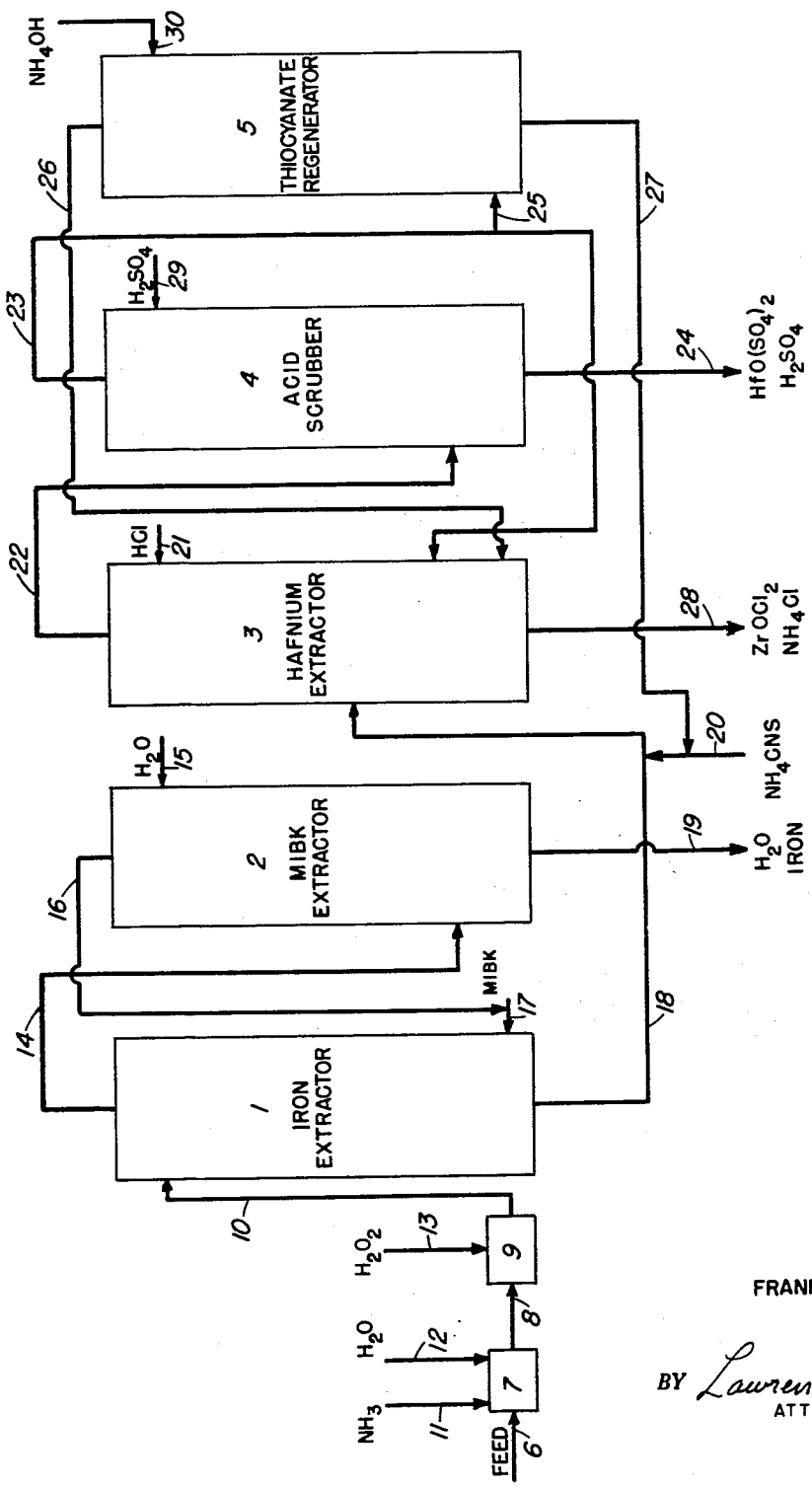
FRANKLYN D. MILLER
INVENTOR.
BY Lawrence Rosen
ATTORNEY

3,006,719
SOLVENT EXTRACTION PROCESS FOR SEPARATING HAFNIUM FROM ZIRCONIUM
Franklyn D. Miller, Golf Manor, Ohio, assignor to National Distillers and Chemical Corporation, New York, N.Y., a corporation of Virginia
Filed July 17, 1957, Ser. No. 672,383
5 Claims. (Cl. 23—22)

The present invention relates to a new and improved process for the separation of zirconium and hafnium compounds from mixtures containing the same. More particularly, the invention pertains to a method for treating such mixtures to ensure effective separation of the hafnium from the zirconium compounds. The invention is also concerned with the removal of iron impurities from mixtures of hafnium and zirconium compounds.

In recent years methods for the separation of hafnium from zirconium, metals which are normally associated together in nature and which are difficult to separate from each other, have become very important due to increased demands for the production of high grade hafnium and zirconium metals and compounds. One proposed method for separating hafnium from zirconium compounds involves the preferential solvent extraction of hafnium as a thiocyanate complex. This process is based primarily on the work of Fischer et al. which is described in "Z. anorg. Chem.," 255, pages 79–100, and pages 277–286 (1947). In general, the process comprises extracting an aqueous solution of hafnium and zirconium sulfates containing ammonium thiocyanate with an ether solution of thiocyanic acid to obtain an organic layer containing the hafnium. It was later found that methyl isobutyl ketone could be used in place of the ether to achieve improved results as indicated by separation factors as high as 80. In attempting to adapt this process for commercial operation, serious problems have arisen due to polymer formation in the extraction towers which necessitate frequent shut-downs of the towers for cleaning. The polymer formation is believed to be caused by the decomposition of thiocyanic acid with subsequent reaction of the decomposition products to form the undesirable polymers. Unless the metal feed solution is very dilute some precipitation of zirconium and hafnium sulfates will also occur.

One object of this invention is to overcome the above described difficulties encountered in the thiocyanate separation process. Another object of the invention is to adapt the thiocyanate separation process to provide continuous and effective separation in plant operations. Other objects will become readily apparent from the ensuing description of the invention.

In accordance with the present invention, it has been found that the presence of iron in the zirconium-hafnium feed material has a considerable effect on the formation of polymers. It has been further found that if the iron impurities normally associated with the naturally occurring zirconium-hafnium feed material are substantially removed prior to treatment of the latter in the extraction columns, polymerization is substantially reduced; and, consequently, the shut-down periods required in the prior art processes are avoided. Accordingly, the present invention is directed specifically to removing the undesirable iron impurities from the zirconium-hafnium feed material and the prevention of polymer formation during hafnium extraction. In general, the process of the invention comprises extracting the iron by contacting the zirconium-hafnium mixtures with selective solvents. Methyl isobutyl ketone has been found to be a particularly effective extractant for the iron impurities, and the purification treatment may be carried out conveniently by countercurrently contacting solutions of zirconium and hafnium compounds with this material. Though methyl isobutyl ketone is the preferred extractant for the purposes of this invention, it will be understood that other extractants such as ethyl ether, butyl ether, ethyl acetate, and butyl acetate, may also be employed. The methyl isobutyl ketone is also known as "MIBK" and "hexone" and these terms will be used interchangeably throughout the ensuing description.

It has also been found that the removal of iron from the zirconium-hafnium feed mixtures should be as complete as possible. Since methyl isobutyl ketone extracts only ferric iron, it is an essential feature of this invention that ferrous iron, which is normally present in the feed material, be converted to ferric iron prior to contact with the extractant. The conversion of the ferrous iron to the ferric state may be carried out readily by contacting the zirconium-hafnium feed with hydrogen peroxide. The desired oxidation may also be accomplished by utilizing conventional techniques or other oxidizing agents such as chlorine, nitric acid, air, and the like. The use of hydrogen peroxide is, however, preferred, since it is easy to handle and the possibility of deleterious by-products being formed is avoided. Chlorine, for example, is very difficult to work with, while air is too insoluble and requires excessive treatment periods. Ordinarily, only enough of the oxidizing agent required for complete oxidation of the ferrous iron need be employed. It is contemplated, however, that an excess of the oxidizing agent may be employed to ensure complete conversion to ferric iron. If metallic iron is present in the zirconium-hafnium feed, its removal is also desirable. A convenient method for removing metallic iron would be to subject the crude feed to magnetic separators prior to any chemical treatment, such as during its passage through the solid feed conveyor systems usually employed in handling the feed material. The metallic iron can also be separated by dissolving the feed material in water and then filtering or allowing it to settle out of solution.

The zirconium-hafnium mixtures useful for the purposes of this invention may be derived from any known source. In preparing the starting material, for example, zirconium ores or compounds containing the usual hafnium impurities are subjected to halogenation in accordance with well established processes. The resulting zirconium and hafnium halide mixtures may then be employed directly in the process of this invention. Such mixtures containing zirconium and hafnium chlorides, particularly the tetrachlorides, are preferred starting materials. Nevertheless, it will be understood that bromide and iodide mixtures of these metals may also be successfully employed. The relative proportion of the hafnium and zirconium in the feed material may vary over a wide range, though in most instances the feed material will contain a major proportion of zirconium. This is understandable since the naturally occurring mixtures of these metals will contain only a relatively minor proportion of hafnium.

The accompanying schematic drawing is a flow sheet illustrating one embodiment of the invention for separating hafnium from zirconium compounds which involves the pretreatment of the feed material to remove the deleterious iron impurities. For purposes of a more complete description, the process will be described utilizing as feed material a mixture comprising zirconium and hafnium tetrachlorides. A number of the possible modifications encompassed by the invention will also be discussed, though it will be understood that the following separation process is presented for illustrative purposes only. Referring now to the drawing, a solid mixture comprising zirconium and hafnium tetrachlorides are fed via line 6 to tank 7 where it is contacted simultaneously with ammonia and water entering tank 7 via lines 11 and 12, respectively. The use of ammonia at this stage is optional, since it is primarily used to neutralize hydrochloric acid and thereby increase the solubility of zirconium oxychloride. The zirconium and hafnium tetrachlorides are converted by hydrolysis to the corresponding oxychlorides, which are soluble in the aqueous reaction medium. The resulting aqueous solution of the zirconium and hafnium oxychlorides is then passed via line 8 to tank 9 wherein it is contacted with hydrogen peroxide charged via line 13 to effect the oxidation of the ferrous iron present in the aqueous solution to ferric iron. The reaction mixture in tank 9 is acidic in nature, a HCl normality greater than one being preferred. Following oxidation of the ferrous iron to the ferric state, the aqueous solution of the zirconium and hafnium oxychlorides is passed via line 10 to the top of extraction column 1. Methyl isobutyl ketone is charged via line 17 to the bottom of extraction column 1 where it countercurrently contacts the downwardly flowing oxychloride solution at a temperature of about 0° to 60° C. The higher temperatures are preferred because of the greater solubility of the metal oxychlorides, but the actual temperature used is limited by the volatility of the MIBK extractant. The MIBK solution containing the extracted iron is recovered at the top of column 1 and passed via line 14 to the bottom of column 2 where it is contacted with a downwardly flowing stream of water charged to column 2 via line 15. The water extracts the iron from the MIBK, and the latter may then be recycled from the top of column 2 via lines 16 and 17 to the bottom of column 1. The water containing the extracted iron is removed from the bottom of column 2 via line 19 and is discarded.

The iron-free zirconium and hafnium oxychloride solution recovered at the bottom of column 1 is passed via line 18 to the middle of column 3. Ammonium thiocyanate is added via line 20 to the iron-free oxychloride solution. In column 3, hydrochloric acid is passed to the top of the column via line 21 while MIBK is added at the bottom of column 3 via line 23. At the top of column 3 an organic phase comprising MIBK, hafnium thiocyanate complex, etc. is recovered and passed via line 22 to column 4 where it is countercurrently contacted with downwardly flowing sulfuric acid entering column 4 via line 29. Referring back to column 3 a zirconium oxychloride phase is recovered via line 28 from the bottom of said column. In addition to zirconium oxychloride, the recovered mixture will contain ammonium chloride and thiocyanic acid, which may be recovered by scrubbing with MIBK. In column 4 the acid-scrubbed hafnium compound is recovered from the bottom of the column via line 24 and will comprise hafnium oxysulfate and sulfuric acid. MIBK and thiocyanic acid is recovered at the top of column 4 and passed via lines 23 and 25 to the bottom of column 5 wherein it is contacted with a downwardly flowing stream of ammonium hydroxide, entering the top of column 5 via line 30. The ammonium thiocyanate recovered at the bottom of column 5 is passed via lines 27 and 20 for admixture with the iron-free zirconium and hafnium oxychloride solution. MIBK is recovered at the top of column 5 and passed via line 26 to the bottom of column 3. It is also contemplated that from about 60 to 80% of the MIBK and thiocyanic acid is recovered at the top of column 4 and may be recycled directly via line 23 to column 3.

It will be apparent that in actual operation of the process of the invention the equipment described above could be varied in accordance with engineering techniques. For example, a number of extraction columns could be employed in series to ensure effective separation of the iron from the oxychloride solution and the subsequent separation of the hafnium from the zirconium. Conventional feed and recycle pumps would also be employed.

It should be noted that the invention not only provides an effective method for removing the iron impurities from the feed material, but it also permits the operation of a comparatively inexpensive and direct method for regenerating the extractant material. Thus, when the iron-containing MIBK extractant is recovered from column 1 via line 14, it may be effectively and efficiently regenerated in column 2 merely by countercurrently contacting with it water, which removes the iron from the MIBK. The regenerated extractant may then be directly recycled to column 1 without any further treatment. It is obvious that this extractant recovery system provides a continuous operation. The removal of iron from the MIBK solution may also be accomplished by extraction with ammonia or caustic solutions. However, the discovery that MIBK can be regenerated directly with water is an important aspect of this invention.

The invention will be further understood by reference to the following illustrative example:

*Example*

(A) A solution of crude zirconium tetrachloride (containing 2% hafnium) was prepared by dissolving 250 pounds in enough water to make 80 gallons of solution. To this was added 5 gallons of 28% ammonia and 110 ml. of 30% hydrogen peroxide. The resulting solution contained 12.38 g. of metal/100 ml. and had a density of 1.245 at 26° C. This solution was contacted countercurrently with an equal volume of MIBK in a 6 in. baffle plate column. The iron-rich MIBK was regenerated by scrubbing with an equal amount of water in a 4 in. spray tower. The extracted zirconium solution contained less than 25 p.p.m. of iron based on zirconium. This is less than 2.5 p.p.m. based on solution. The solution does not give a typical qualitative test for iron. Before extraction the iron content was 1100 p.p.m. based on metal.

(B) Crude zirconium tetrachloride (375 lbs.) was dissolved in 155 gallons of water. To this solution was added 148 lbs. of 28% ammonia. The resulting solution was contacted countercurrently in a 6 in. baffle plate column with an equal volume of MIBK, and the MIBK was stripped by scrubbing in a 4 in. spray column with an equal volume of water. The iron content before extraction was 840 p.p.m. and after extraction was 460 p.p.m., based on metal.

The above data show that contaminating iron can be effectively removed from solutions of zirconium and hafnium compounds by following the process of this invention. It should be particularly noted that oxidation of the crude zirconium-hafnium feed prior to extraction with MIBK gives outstanding results.

While particular embodiments of this invention are shown above, it will be understood that the invention is not limited thereto, since modifications can be made without departing from the broader aspects of the above described invention and the appended claims.

What is claimed is:

1. In the process for separating hafnium from zirconium values which comprises contacting a feed material containing zirconium and hafnium tetrahalides, said tetrahalides being selected from the group consisting of tetrachlorides, tetrabromides and tetraiodides, with water to form an aqueous feed solution, contacting said aqueous solution in a separation step with ammonium thiocyanate, methyl isobutyl ketone, and hydrochloric acid, and separating the resulting hafnium-rich phase from a zirconium-rich, hafnium-depleted phase, the improvement which comprises contacting said aqueous feed solution, in an initial extraction step and prior to said separation step, with an extractant consisting essentially of a material selected from the group consisting of methyl isobutyl ketone, ethyl ether, ethyl acetate, butyl ether and butyl acetate, to extract ferric iron values from said aqueous feed solution thereby preventing polymer formation when said feed solution is treated in said separation step, and separately recovering a substantially ferric iron-free aqueous feed solution and an extract phase containing said extractant and ferric iron.

2. The process of claim 1 wherein said tetrahalides are tetrachlorides.

3. The process of claim 1 wherein said ferric iron extractant is methyl isobutyl ketone.

4. The process of claim 1 wherein said aqueous feed solution is contacted with hydrogen peroxide, prior to ferric iron extraction, to convert ferrous iron to ferric iron.

5. The process of claim 1 wherein said separately recovered extract phase, containing the extractant and ferric iron, is contacted with water to remove ferric iron from the extractant, and said iron-free extractant is recycled to said initial extraction step.

References Cited in the file of this patent

UNITED STATES PATENTS

| | | |
|---|---|---|
| 2,249,761 | Hixson | July 22, 1941 |
| 2,757,081 | Hure et al. | July 31, 1956 |
| 2,833,616 | Voiland | May 6, 1958 |
| 2,847,279 | Tucker | Aug. 12, 1958 |
| 2,910,345 | Van Winkle et al. | Oct. 27, 1959 |
| 2,938,769 | Overholser et al. | May 31, 1960 |

FOREIGN PATENTS

| | | |
|---|---|---|
| 219,983 | Great Britain | Oct. 29, 1925 |

OTHER REFERENCES

Ramsey et al.: U.S. Atomic Energy Comm., Public. Y817, Oct. 12, 1951.

West in "Metallurgia," vol. 43, January 1951, pp. 41–46; vol. 54, July 1956, pp. 47–51.

Stevenson, P. C., et al.: "Separation of Tantalum and Niobium by Solvent Extraction," Analytical Chemistry, vol. 25, No. 10, October 1953, pages 1517–1519.

Leaders, W. M.: Atomic Energy Comm., Report, Y-449, July 22, 1949, pages 3–10.